United States Patent [19]

Breton

[11] Patent Number: 5,531,823
[45] Date of Patent: Jul. 2, 1996

[54] LOW-HEAT HIGH-PERFORMANCE CONCRETE

[75] Inventor: Dannys Breton, Sherbrooke, Canada

[73] Assignee: Atomic Energy Of Canada Limited, Ottawa, Canada

[21] Appl. No.: 384,645

[22] Filed: Feb. 6, 1995

[51] Int. Cl.⁶ .................................................. C04B 7/02
[52] U.S. Cl. .................... 106/713; 106/724; 106/725; 106/733; 106/737; 106/738
[58] Field of Search .................... 106/737, 713, 106/724, 725, 738, 823, 817, 733

[56] References Cited

U.S. PATENT DOCUMENTS

| | | | |
|---|---|---|---|
| 2,250,107 | 7/1941 | Nelles . | |
| 2,458,039 | 1/1949 | Wait . | |
| 3,017,677 | 1/1962 | Greenwald, Jr. . | |
| 3,753,748 | 6/1970 | Martin | 106/717 |
| 4,210,457 | 7/1980 | Dodson et al. | 106/DIG. 1 |
| 4,221,579 | 9/1980 | Mallow | 65/114 |
| 4,256,500 | 3/1981 | Turpin, Jr. | 106/DIG. 1 |
| 4,274,881 | 6/1981 | Langton et al. | 106/698 |
| 4,442,219 | 4/1984 | Teneyck et al. | 501/95 |
| 4,482,385 | 11/1984 | Satkowski et al. | 106/737 |
| 4,505,753 | 3/1985 | Scheetz et al. | 106/737 |
| 4,640,715 | 2/1987 | Heitzmann et al. | 106/709 |
| 4,684,407 | 8/1987 | Umezawa et al. | 106/706 |
| 4,780,141 | 10/1988 | Double et al. | 106/692 |
| 4,861,378 | 8/1989 | Watanabe et al. | 106/DIG. 4 |
| 4,915,741 | 4/1990 | Biagini et al. | 106/705 |
| 4,921,537 | 5/1990 | Horiguchi et al. | 106/725 |
| 4,963,515 | 10/1990 | Helferich | 501/84 |
| 4,964,912 | 10/1990 | Okabayashi et al. | 106/705 |
| 4,999,056 | 3/1991 | Rasmussen | 106/737 |
| 5,098,873 | 3/1992 | Edwards et al. | 501/128 |
| 5,106,557 | 4/1992 | Rirsch et al. | 264/118 |
| 5,147,459 | 9/1992 | Lynn et al. | 106/601 |
| 5,250,113 | 10/1993 | Berke et al. | 106/737 |

OTHER PUBLICATIONS

Langley, W. S. et al., "Strength Development and Temperature Rise in Large Concrete Blocks Containing High Volumes of Low-Calcium (ASTM Class F) Fly Ash", *ACI Materials Journals*, (Jul.–Aug. 1992).

Malhotra, V. M. et al., "Condensed Silica Fume in Concrete," *CRC Press*, (1987) pp. 77–95 journal pp. 362–368.

Neville, A. M. et al., *"Concrete Technology"*, Longman Scientific & Technical, (1987), pp. 242–246.

Springenschmid, R. et al., "Technological Aspects for High-Strength-Concrete in Thick Structural Members, Symposium", (Jun. 15–18, 1987), Norway.

*Primary Examiner*—Paul Marcantoni
*Attorney, Agent, or Firm*—Sughrue, Mion, Zinn, Macpeak & Seas

[57] ABSTRACT

A Low Heat High Performance Concrete (LHHPC) composition having a very low cement content and high W/CM ratio offers high strengths, low heat of hydration, excellent volumetric stability, low chloride permeability and low pH. To reduce the cement content while maintaining high performance, silica fume and silica flour are used in large quantities. The LHHPC composition can be used for high mass concrete structures and other applications which require low heats of hydration yet offers compressive strength comparable to Standard High Performance Cement (SHPC).

11 Claims, 4 Drawing Sheets

LOW-HEAT HIGH-PERFORMANCE CONCRETE

BACKGROUND OF THE INVENTION

This invention relates to a new low-heat, high-performance concrete.

Many engineering applications require high performance concrete having high strength and hardness and low permeability to air and water. Standard High Performance Concrete ("SHPC") exhibits such qualities having a 28 day unconfined compressive strengths ($\sigma_c$) of 70 MPa or more.

SHPC relies on high Portland cement content in the range of 450–550 kg/m$^3$ (or about 20% by weight) to achieve high strength. Portland cement is an unhydrated mixture of oxides and sesqui-oxides of compounds of calcium, silicon and aluminum combined with trace elements and compounds. The four major compounds in Portland cement are $C_3S$, $C_2S$, $C_3A$ and $C_4AF$ where C is CaO, S is $SiO_2$, A is $Al_2O_3$ and F is $Fe_2O_3$. The silicates $C_3S$ and $C_2S$ are generally ascribed as the compounds from which materials such as concretes, mortars and grouts, that are formed when the cement is hydrated, derive their desirable mechanical and engineering properties. When hydrated, the silicates form C—S—H (tobermorite) gels and CH (portlandite), where H is $H_2O$.

The hydration of cement produces an exothermic chemical reaction. The main generation of heat, which is initially retarded by gypsum in the mixture, begins at about 12 hours after mixing with water, reaches a maximum rate between about 24 and 48 hours after mixing, and then begins to decrease. Empirical relationships indicate that, when perfectly insulated against heat loss, for each 100 kg of cement per cubic meter of concrete, the heat of hydration will increase the temperature of the concrete by between about 8° and 12° C.

As the heat produced in concrete is proportional to the cement content, SHPC which relies on high cement content undergoes considerable heating during curing. As a result, SHPC is generally unsuitable for mass concrete structures. During hydration of mass concrete structures, the rate of heat generation far exceeds the rate of dissipation to the surroundings producing a non-linear temperature distribution across the structure. This induces tensile stresses which can cause surface cracking. In addition, the volume change associated with the temperature change as the heat is dissipated also induces tensile stresses leading to continuous splitting cracks.

High rates and quantities of heat generation in mass structures also leads to lower final strength. The lower final strength of concrete cured at a high temperature has been attributed to accelerated hydration which results in nonuniformly distributed C—S—H hydration products formed closely around the cement particles, and to internal stresses and microcracking.

Some of the effects of high rates and quantities of heat generation can be mitigated by special procedures such as the use of cooled water and aggregates, the inclusion of ice during the preparation of the concrete, and liquid nitrogen cooling of the fresh concrete. These procedures increase costs and can produce technically undesirable results.

It is known to substitute silica fume for a portion of the Portland cement in order to reduce the heat of hydration and enhance the properties of SHPC. Silica fume, a waste product from the ferro-silicon manufacturing process, consists of amorphous silicates with a mean equivalent spherical diameter of about 0.25 μm. Silica fume reacts with the CH liberated during the hydration of Portland cement to form C—S—H. The total heat released by this pozzolanic reaction is double that released during the hydration of Portland cement. However, the pozzolanic reaction proceeds at a slower rate than the cement hydration reaction and as a results, the heat from the pozzolanic reaction does not build up in, and increase the temperature of, the concrete as much as the heat of hydration from the more rapid cement hydration reaction.

While reduced heat build-up and enhanced properties can be realized by the addition of silica fume, high addition levels of 30% by dry mass replacement of cement are reported by Malhotra et al. in *Condensed Silica Fume in Concrete*, 1987, CRC Press, Inc. to cause increased shrinkage. Accordingly, silica fume addition levels are generally restricted to between 10 and 15%.

It is also known to add quantities of inert fillers to mixtures of Portland cement and silica fume to increase the strength of the mixture. In U.S. Pat. Nos. 4,482,385, 4,505,753 and 4,780,141, cementitious compositions are disclosed which contain Portland cement, silica fume and other ingredients including fine aggregate, preferably a crystalline silica having a particle size below 5 microns. Although these compositions contain substantial quantities of silica fume and inert filler, they rely primarily on the conventional understanding that high strength and enhanced properties are achieved through low water to cement ("W/C") and low water to cementitious materials ("W/CM") ratios. In particular, the W/C ratios in the preferred compositions of the '385, '753 and '141 patents are 0.24, 0.24 and 0.25 respectively and the W/CM ratios are 0.27, 0.27 and 0.28 respectively. Furthermore, the cement to silica ratios of these compositions are about 1:0.62, 1:0.63 and 1:0.60. Such proportions of cement can be expected to produce substantial heats of hydration approaching that of conventional Portland cement based concretes.

SUMMARY OF THE INVENTION

It is an object of the present invention to provide a cementitious composition having low-heat generation, high volumetric stability and high-performance, suitable for use in high mass structures. The low-heat high-performance concrete (LHHPC) of the present invention is characterized by a low cement content and a high water/cementitious materials ratio. To maintain sufficient cementitious materials in the composition for high strength, a large quantity of pozzolanic silica is used. It has been found that the endogenous shrinkage associated with high addition levels of pozzolanic silica to high W/CM compositions can be substantially eliminated by the addition of large quantities of inert mineral flour fillers.

Thus, in accordance with one aspect of the present invention, there is provided a cementitious composition comprising:

a. Portland cement;
b. pozzolanic silica;
c. inert mineral flour;
d. aggregate;
e. superplasticizer
f. water;

wherein the amount of Portland cement in the composition is in the range of 3% to 10%, the ratio of Portland cement to pozzolanic silica is between 1:0.8 and 1:1.2, the ratio of Portland cement to inert mineral flour is between 1:1.6 and 1:2.4 and the W/CM ratio of the composition is in the range of 0.40–0.55. The preferred pozzolanic silica is condensed silica fume. The preferred inert mineral flour is silica flour having a particle size below about 50 microns.

The above and other objects, features and advantages of the present invention will become apparent from the following description taken with the accompanying drawings.

DESCRIPTION OF PREFERRED EMBODIMENTS

Figure 2:
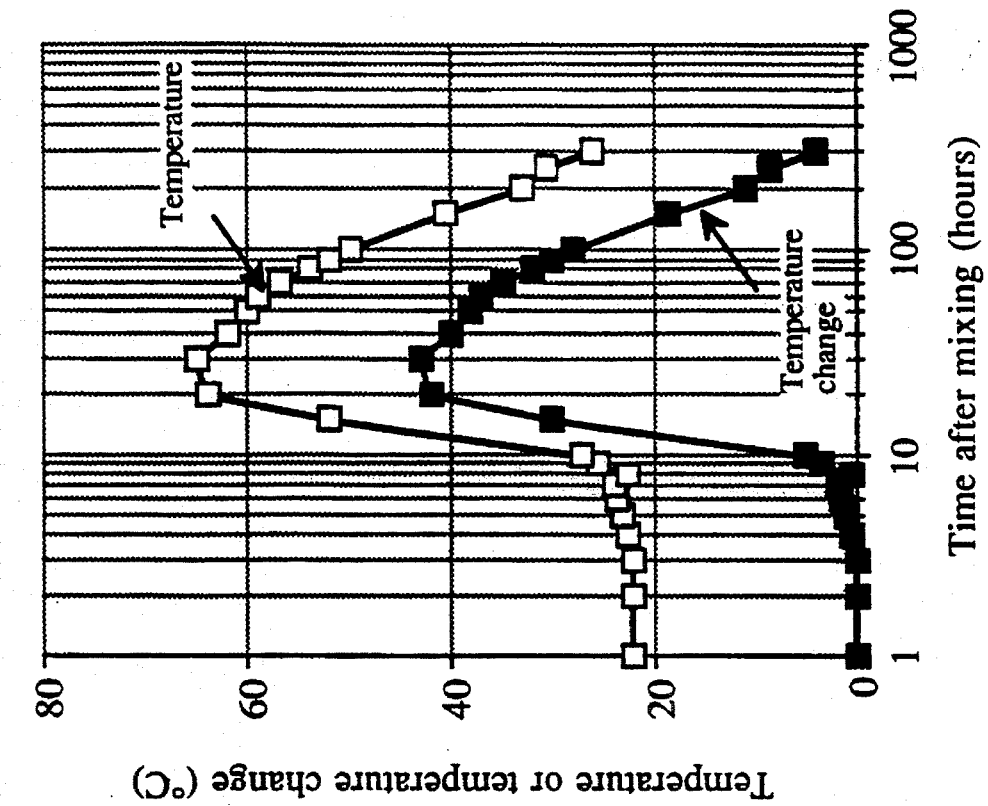
FIG. 2 is a graphical representation of the temperature of a SHPC composition as a function of time after casting.

The invention is a composite material comprising a mixture of (a) Portland cement; (b) pozzolanic silica; (c) non-pozzolanic mineral flour filler; (d) aggregate; (e) superplasticizer and (f) water.

(a) Portland Cement

While any of the commercially available grades of Portland cement can be used in the present invention, Type V (U.S.)/Type 50 (Canada) cement is preferred. In order to achieve the low heat characteristics of the present invention, the amount of Portland cement in the composition should be in the range of about 3 to 10% by weight of the composition, with a range of about 3.5 to 4.5% being preferred.

(b) Pozzolanic Silica

The pozzolanic silica used in the present invention is an amorphous, noncrystalline silicon dioxide, preferably condensed silica fume. Silica fume is a waste product from the ferro-silicon manufacturing process and has a mean particle diameter of about 0.25 μm. The pozzolanic silica reacts with the CH liberated during the hydration reaction of Portland cement to form new C—S—H. The amount of pozzolanic silica should be such that the ratio of Portland cement to pozzolanic silica is in the range of about 1:0.8 to 1:1.2, with a ratio of 1:1 being preferred.

(c) Non-pozzolanic Mineral Flour Filler

The non-pozzolanic mineral flour filler used in the present invention includes flours such as quartz, ilmenite or iron oxide having an equivalent spherical particle size of up to about 50 μm. The preferred mineral flour filler is silica flour the main constituent of which is quartz (>90% by dry mass). For optimum effect, the particle size of the mineral flour should be substantially the same as the size of the cement particles and the hydration reaction products. The amount of non-pozzolanic mineral flour should be such that the ratio of Portland cement to non-pozzolanic mineral flour is in the range of about 1:1.6 to 1:2.4, with a ratio of 1:2 being preferred.

(d) Aggregate

The aggregate used in the present invention can be that conventionally used in mass structure concrete compositions and advantageously includes a mixture of sand-like fine aggregate and coarse crushed stone like aggregate having a size predominantly in the range of between about 4.5 mm to 12.5 mm. The amount of aggregate present should be such that the proportion of Portland cement in the composition falls in the ratios referred to above.

(e) Superplasticizer (Optional)

To render the composition more fluid and to improve wetting and mixing, a superplasticizer is included in the composition. A suitable superplasticizer is a condensed Na salt of sulphonated formaldehyde which is widely commercially available under a variety of trade names. The amount of superplasticizer should be such that the ratio of Portland cement to superplasticizer is in the range of from 8:1 to 12:1, with a ratio of about 10:1 being preferred.

(f) Water

The amount of water in the composition of the present invention should such that the W/CM ratio is in the range of about 0.40–0.55, with a range of about 0.46–0.49 being preferred.

The properties of the composition of the present invention were compared against those of a SHPC. The components listed in Table 1 under LHHPC were mixed to form an example of the present invention. The component listed under SHPC were mixed to form an example of Standard High-Performance Concrete for comparative purposes.

TABLE 1

|  | LLHPC (kg) | SHPC (kg) |
| --- | --- | --- |
| Components |  |  |
| Portland Cement | 97.0 | 497.0 |
| Silica Fume | 97.0 | 49.7 |
| Silica Flour | 193.8 | 0.0 |
| Fine Aggregate | 894.7 | 703.2 |
| Coarse Aggregate | 1039.6 | 1101.0 |
| Superplasticizer (dry mass) | 10.3 | 7.1 |
| Water | 91.9 | 123.9 |
| Properties |  |  |
| Density | 2424 kg/m$^3$ | 2482 kg/m$^3$ |
| Air Content | 2.8% | 1.8% |
| Slump | 170 mm | 230.0 mm |

In each of the LHHPC and SHPC examples in Table 1, the Portland cement used was Type V (US)/Type 50 (Canada), the silica flour was comprised of over 90% by dry mass of inert quartz particles having a particle size similar to the Portland cement grains (≤45 μm), the aggregates used were a crusher run coarse granite aggregate of 4.5 to 12.5 mm size, and natural sand-sized fine aggregate with a fineness modulus of 2.66 and the superplasticizer was a condensed Na salt of sulphonated naphthalene formaldehyde. The LHHPC example was compared to the SHPC example by measuring the following characteristic properties: temperature rise during curing, compressive strength, tensile strength, dimensional stability in air and water, and pH.

Temperature Rise

Figure 1:
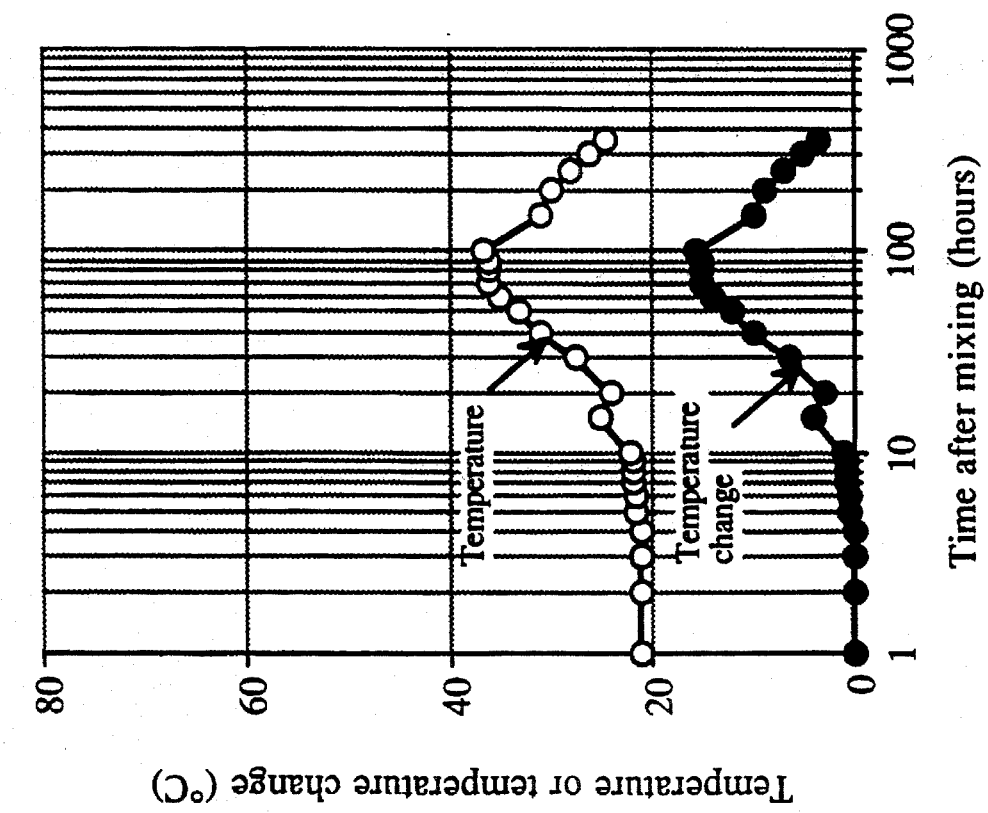
FIG. 1 is a graphical representation of the temperature of the LHHPC composition of the present invention as a function of time after casting.

The temperatures were measured with time at the centre of cubical specimens poured into an insulated box with a specimen volume of 0.027 $m_3$. The results for the LHHPC and SHPC examples are shown in FIGS. 1 and 2, respectively. The maximum temperature reached by the LHHPC was 37° C. corresponding to a temperature rise of only 15° C. This is far lower than the 65° C. temperature reached by the SHPC corresponding to a 43° C. rise. Consistent with these findings, the LHHPC releases only about one-third of the heat released by the SHPC.

Compressive Strength ($\sigma_c$)

Figure 4:
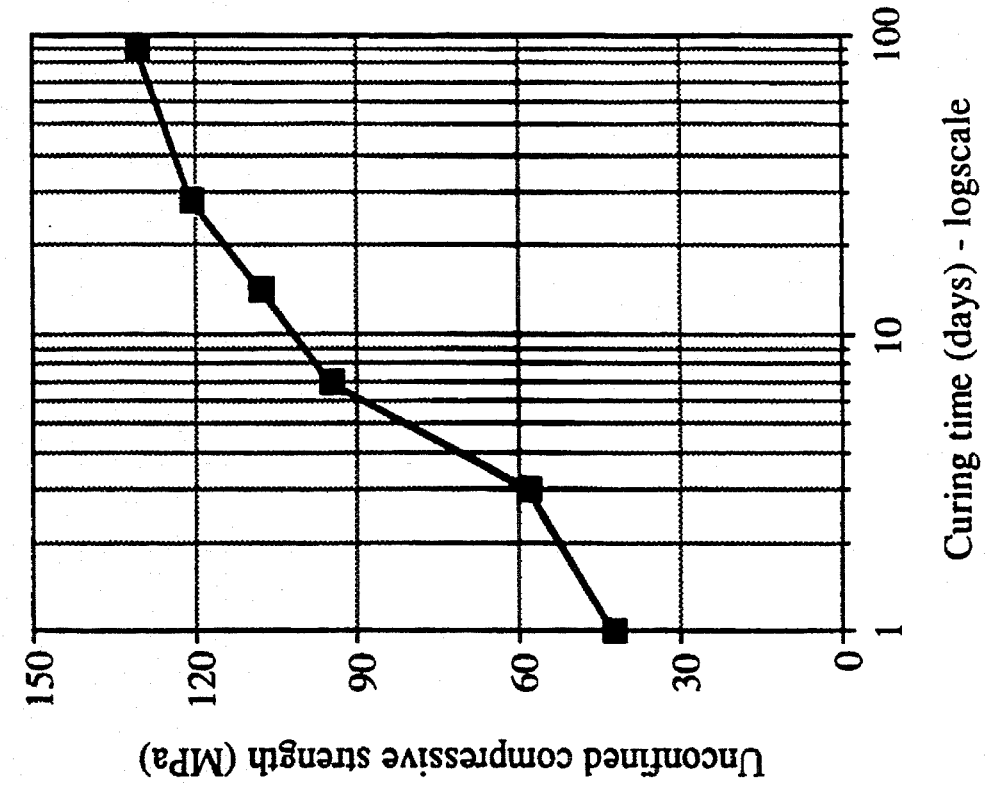
FIG. 4 is a graphical representation of the compressive strength of an SHPC composition as a function of time after casting.
Figure 5:
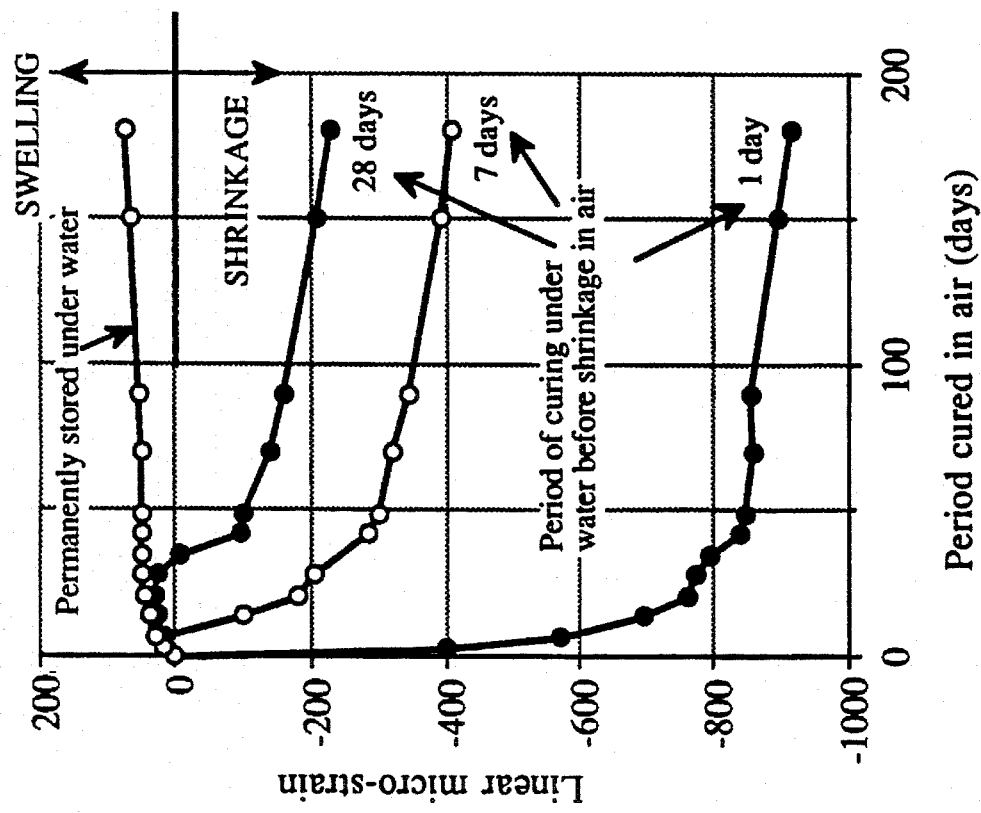
FIG. 5 is a graphical representation of the linear variation of the LHHPC composition of the present invention under water and air as a function of time after casting.

Unconfined compressive strengths were measured on cylindrical specimens (100 mm diameter, 200 mm long) in accordance with ASTM Standard C 39–86. Twenty-four hours after casting, the samples were stripped from their moulds and immersed in saturated lime-water to cure for predefined periods. The results for the LHHPC and SHPC examples are shown in FIGS. 4 and 5, respectively. The results show that the LHHPC gains strength initially more slowly than the SHPC but with time, the rate of strength development increases and the curves being to merge. High performance concrete are defined by a minimum 28 day $\sigma_c$ of 70 MPa. The 28 day compressive strength of the LHHPC example ($\sigma_c$=87 MPa) qualifies the LHHPC material of the present invention to be classified as high-performance concrete. The $\sigma_c$ of the LHHPC continues to increase with time after 28 days to over 100 MPa.

Tensile Strength ($\sigma_T$)

Cylindrical specimens (100×200 mm) of SHPC and LHHPC were tested in accordance with ASTM Standard C496-86. Measurements of 5 sets of 3 samples each of SHPC at 1, 3, 7, 28 and 90 days after casting were recorded and the results are presented in Table 2. Measurements of 3 sets of 3 samples each of LHHPC at 7, 28 and 90 days after casting were recorded and the results are presented in Tables 3.

TABLE 2

SHPC

| Sample | Age (days) | Load (kN) | Stress (MPa) | Length (mm) | Mass (gm) | Density (g/cc) |
|---|---|---|---|---|---|---|
| 1 | 1 | 143.3 | 4.4 | 204.0 | 4085.3 | 2.50 |
| 2 | 1 | 152.8 | 4.7 | 204.5 | 4116.7 | 2.51 |
| 3 | 1 | 150.3 | 4.6 | 204.0 | 4088.0 | 2.50 |
| 4 | 3 | 179.8 | 5.6 | 204.0 | 4113. | 2.52 |
| 5 | 3 | 156.0 | 4.8 | 204.5 | 4102.1 | 2.50 |
| 6 | 3 | 179.2 | 5.5 | 204.5 | 4108.0 | 2.51 |
| 7 | 7 | 169.5 | 5.3 | 203.0 | 4085.5 | 2.51 |
| 8 | 7 | 188.7 | 5.8 | 204.5 | 4111.0 | 2.51 |
| 9 | 7 | 172.6 | 5.3 | 204.5 | 4122.7 | 2.52 |
| 10 | 28 | 193.5 | 6.0 | 204.0 | 4108.6 | 2.51 |
| 11 | 28 | 195.7 | 6.0 | 203.5 | 4119.8 | 2.53 |
| 12 | 28 | 188.4 | 5.8 | 205.0 | 4152.0 | 2.53 |
| 13 | 90 | 210.0 | 6.5 | 204.0 | 4104.2 | 2.51 |
| 14 | 90 | 202.3 | 6.2 | 204.5 | 4124.9 | 2.52 |
| 15 | 90 | 212.3 | 6.5 | 204.5 | 4126.4 | 2.52 |

TABLE 3

LHHPC

| Sample | Age (days) | Load (kN) | Stress (MPa) | Length (mm) | Mass (gm) | Density (g/cc) |
|---|---|---|---|---|---|---|
| 1 | 1 | | | | | |
| 2 | 1 | | | | | |
| 3 | 1 | | | | | |
| 4 | 3 | | | | | |
| 5 | 3 | | | | | |
| 6 | 3 | | | | | |
| 7 | 7 | 120.2 | 3.7 | 205.0 | 4025.2 | 2.45 |
| 8 | 7 | 120.3 | 3.7 | 204.0 | 4021.0 | 2.46 |
| 9 | 7 | 126.9 | 3.9 | 204.0 | 4026.9 | 2.46 |
| 10 | 28 | 185.8 | 5.7 | 206.0 | 4066.1 | 2.46 |
| 11 | 28 | 195.7 | 6.0 | 204.0 | 4007.3 | 2.45 |
| 12 | 28 | 201.5 | 6.2 | 204.0 | 4009.6 | 2.45 |
| 13 | 90 | 212.5 | 6.6 | 204.5 | 4041.8 | 2.47 |
| 14 | 90 | 239.3 | 7.4 | 204.5 | 4033.9 | 2.46 |
| 15 | 90 | 212.9 | 6.6 | 204.0 | 4032.1 | 2.47 |

The test results in Tables 2 and 3 show that the LHHPC at an early age (7 days) has tensile strength lower than the SHPC but after 28 days about equals SHPC and after 90 days exceeds SHPC.

Volumetric Stability (shrinkage and expansion)

Figure 6:
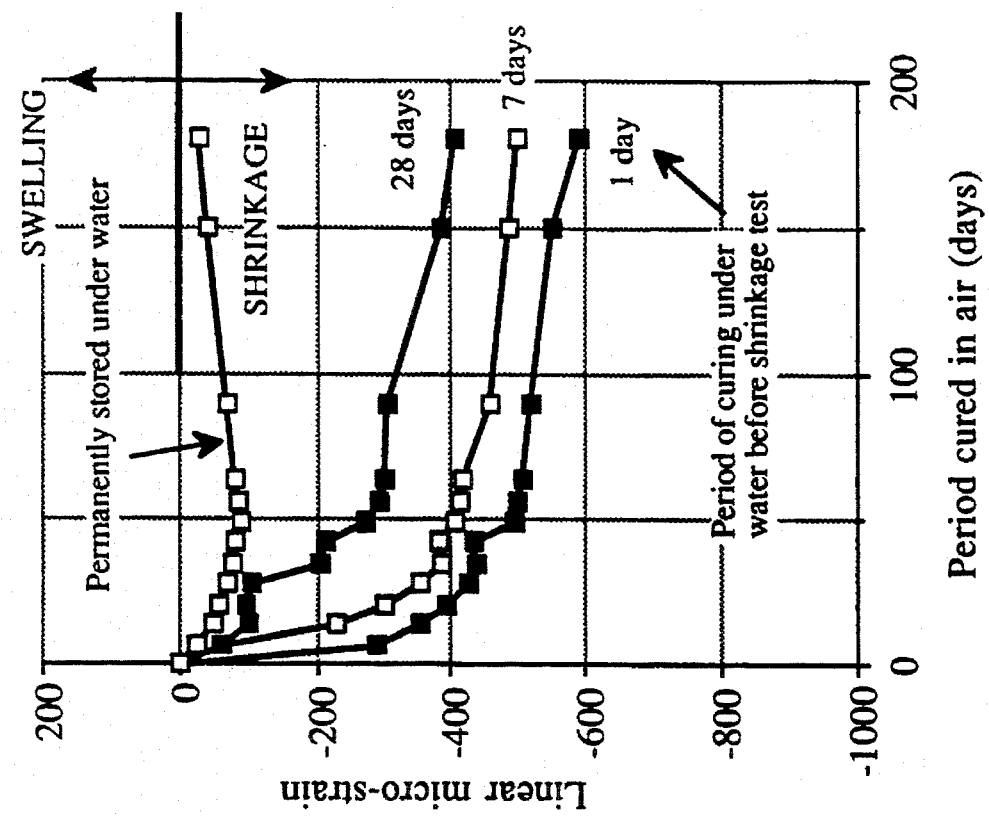
FIG. 6 is a graphical representation of the linear variation of an SHPC composition under water and air as a function of time after casting.

The linear shrinkage and expansion of beam specimens (100×100×300) of SHPC and LHHPC were measured with time in accordance with ASTM Standard C341-84. Specimens were cured for 1,7 and 28 days under water at 23° C. after which they were dried in air on the laboratory bench for various periods and the linear drying shrinkage was measured. For comparison, the changes in length of specimens that were continuously cured under water were measured and the results for LHHPC and SHPC are shown in FIGS. 5 and 6, respectively. As is evident from FIGS. 5 and 6, drying shrinkage of the LHHPC decreases with increasing immersed curing time. Cured under water for less than 7 days, the LHHPC shrinks more than SHPC. However, with longer curing periods, the linear drying shrinkage of the LHHPC is significantly less than that of the SHPC. Cured continuously under water, the LHHPC expands and the SHPC contracts.

pH

Figure 7:
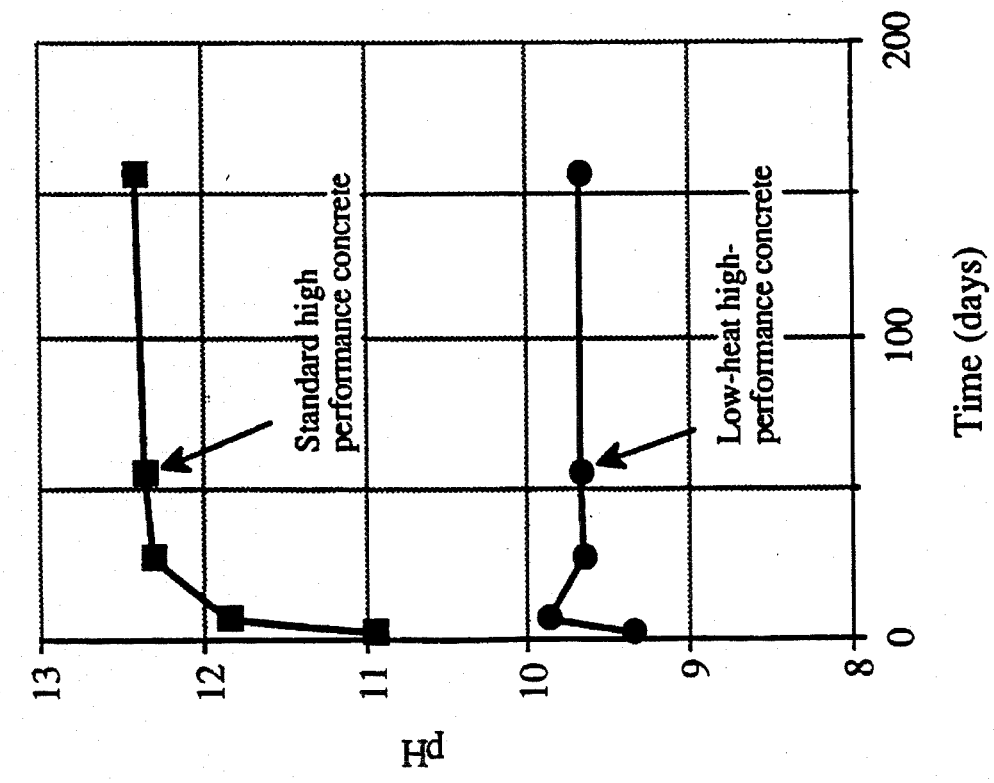
FIG. 7 is a graphical representation of the pH of the LHHPC composition of the present invention and an SHPC composition as a function of time after casting.

The pH of mixtures of equal masses of simulated saline groundwater (500g) such as that found in the Canadian Shield and granulated mortars (500g) of LHHPC and SHPC that had been cured under water for 28 days after casting were measured over time using a Beckman pH meter equipped with an Ag—AgCl electrode. The results for SHPC and LHHPC are presented in FIG. 7 and show that after 6 months, the pH of the LHHPC and the SHPC mixtures are virtually stable at 9.65 and 12.30 respectively.

Without wishing to be bound by any particular theory, it is likely that the relatively low pH of the LHHPC is associated with greater degrees of completion of the pozzolanic reaction than in the SHPC. Moreover, the high content of unreacted silica fume in the LHHPC tends to buffer the system. The amorphous morphology of silica fume is unstable at high pH and reacts with OH— released from the concrete and thus reduces the pH of solution. Low pH in the concrete tends to minimize alkali aggregate reactions which commonly contribute to deterioration of concrete. Conversely, the high pH of normal concrete and SHPC is commonly perceived to benefit reinforced and prestressed concrete structures insofar as the surfaces of steel imbedded in the concrete becomes coated with a passivating layer that limits the rate of corrosion processes. Chloride diffusion tests carried out in accordance with AASHO Standard procedures appear to indicate that the LHHPC does not allow for transmission of Cl—. Chloride ions are generally considered to be the prime agent promoting the corrosion of steel in concrete structures. Accordingly, it is believed that steel in LHHPC will corrode as, if not more, slowly as it corrodes in SHPC.

The compressive strength, tensile strength and volumetric stability tests all show that LHHPC is less mechanically stable than SHPC at early curing periods. However, with time the performance properties of the LHHPC tends to equal or, in the case of volumetric stability, exceed those of SHPC. The delayed development of these mechanical qualities is consistent with the increased super plasticizer content of the LHHPC. Superplasticizers act as retarders, delaying the initiation and the rate of progress of the hydration reactions. Increasing the superplasticizer content in concrete increases the retarding effect. The LHHPC and SHPC formulations of Table 1 have superplasticizer contents of 10 kg/m$^3$ and 7.0 kg/m$^3$ respectively. With significantly lower cement and cementitious materials contents, the LHHPC has much higher ratios of superplasticizer to cement or cementitious materials (by dry mass) than the SHPC. It has been shown that superplasticizers function by reacting with the cement during hydration to eventually become integrated with the hydration reaction products. It is believed that with the higher superplasticizer to cement ratios, the reactions between the superplasticizer and the cement are more extensive and prolonged in the LHHPC.

Figure 3:
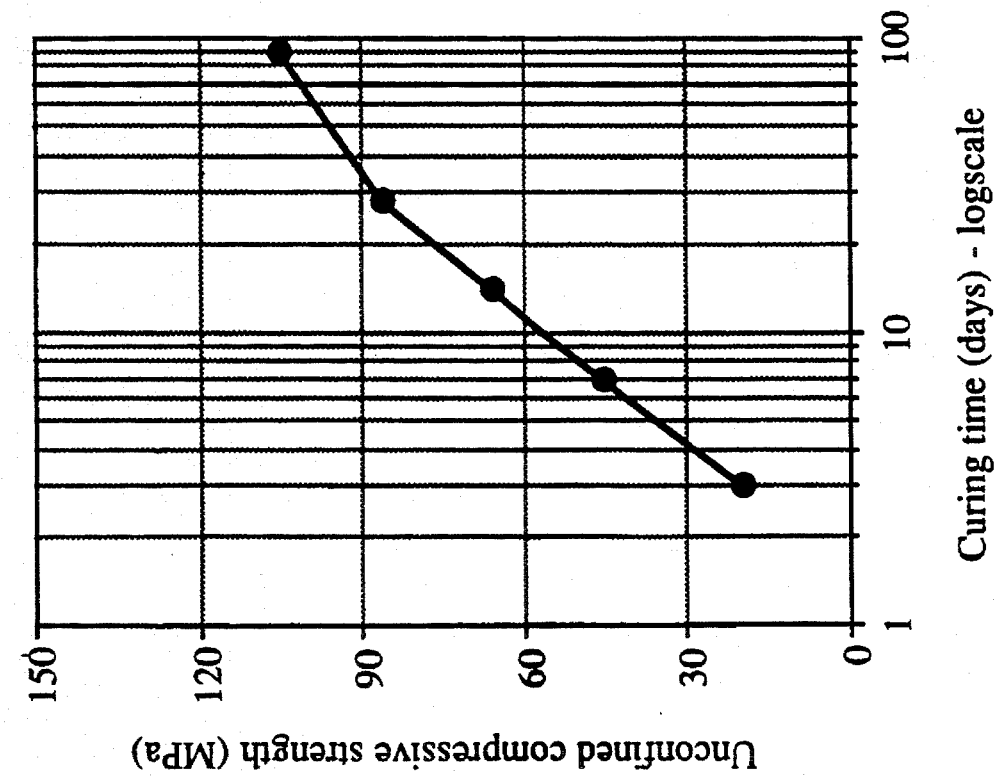
FIG. 3 is a graphical representation of the compressive strength of the LHHPC composition of the present invention as a function of time after casting.
Figure 8:
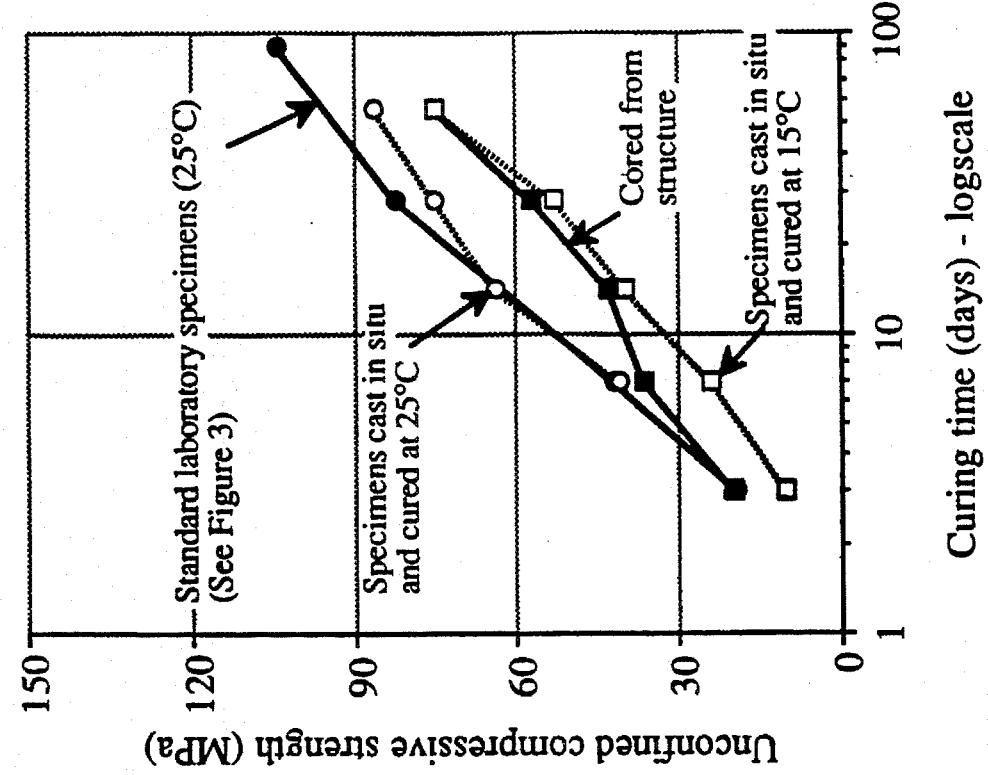
FIG. 8 is a graphical representation of the compressive strength of the LHHPC composition of the present invention as a function of time after casting for mass structure, cylinders cast in situ and laboratory specimens.

The suitability of the LHHPC compositions of the present invention for use in large-scale engineering application is demonstrated by the following test. Nine (9) cubic meters of the LHHPC were mixed and used to build a dam 420 meters underground where the ambient temperature is 15° C. During curing, the temperature at the centre of the dam rose to 24° C. This 9° C. rise was less than the value measured in the laboratory and recorded in FIG. 1. Cores were recovered from the dam and unconfined compressive strength tests were carried out on the recovered cores and on in situ specimens for purposes of comparison. The in situ specimens were cylinders of LHHPC cast during the in situ work and cured at either 15° C. or 25° C. The test results are shown in FIG. 8. For comparison purposes, FIG. 8 also includes the tests result on laboratory specimens taken from FIG. 3.

As is evident from the results in FIG. 8, the strengths of the cylinders cast in situ and cured at 25° C. are substantially the same as those obtained from laboratory prepared specimens. The strengths of both the in situ cylinders and cores are less than those of the laboratory specimens. Largely, a slower rate of hydration at the lower ambient underground temperature is considered to account for both the smaller temperature rise and the slower rate of gain of strength of the in situ placed material.

The performance of the LHHPC compositions of the present invention is surprising in light of the conventional view that enhanced properties of mortars and concrete are achieved by decreasing the water to cement ratio of the composition. Precisely why the LHHPC of the present invention has such enhanced properties with very high W/C and W/CM ratios and very low cement quantities is not completely understood. The following is offered by way of possible explanation, but is not to be construed as limiting the invention in any way. For the SHPC and the LHHPC compositions of Table 1, the W/CM ratios are 0.23 and 0.47 respectively and the W/C ratios are 0.26 and 0.94 respectively. The effects of the higher ratios in the LHHPC are clearly reflected in the results from the drying shrinkage tests. At early ages with the lower degrees of hydration and maturity of the LHHPC paste, there is more free mobile water than in the SHPC paste. This water evaporates from the surfaces and the system responds by contracting. It is believed that at these early ages, the bonding hydrates are not sufficiently well developed to resist the associated internally generated stresses in the concrete. The high content of inert filler and aggregates in the system leaves much less pore space in the LHHPC than in the SHPC for the hydration and pozzolanic reaction products to fill. It can be reasonably inferred from the strength and volume change results that, with increased curing time, the low cement content used in the LHHPC is sufficient to fill the pores and the reaction products become well bonded to the filler and aggregates. Moreover, insofar as the volume of the LHHPC specimens that were fully immersed in water increase with time, as do strengths, it can be suggested that, despite the high W/CM in the LHHPC, the hydration and pozzolanic reactions are incomplete well beyond 90 days after casting. These changes may be associated as much with changes in the morphology of the reaction products as with increases in their quantity. Furthermore, the reaction of silica fume with the cement produces a high formation of gels of C—S—H. Such gels enrobe the mineral flour and include it in a cementitious matrix that will bond advantageously with the aggregate.

The present invention permits a large quantity of cement in concrete to be replaced by a mixture of silica fume and inert flour to decrease heat production to a minimum and avoid endogenous shrinkage while maintaining the advantageous properties of high-performance concrete. When compared to SHPC, the LHHPC of the present invention produces significantly less heat and when hydration is sufficiently advanced, has similar mechanical strength characteristics, better volumetric stability in air and under water, low chloride permeability and a lower pH. Because of its extremely low heat of hydration, the LHHPC of the present invention can be used in mass concrete structures where SHPC is unsuitable due to its high heat of hydration. In addition, the low pH of the LHHPC of the present invention will stabilize the alkali-aggregate reaction permitting the use of aggregate unsuitable for cement compositions having higher pH levels. The low pH and the low chloride permeability contribute to high durability of the LHHPC of the present invention in seawater or similarly saline water, which have a pH of between about 7.5 and 8.4. The LHHPC of the present invention is suitable for high mass structures for use in the geological isolation and disposal of radioactive wastes, although it can be used to form other concrete structures that will benefit from the low heat, low pH and other characteristics of the LHHPC. Although suitable for high mass structures such as dams and foundations, the LHHPC of the present invention can be used for structural elements such as beams, columns and slabs in which many of the adverse effects, such as cracking and increased permeability, that are associated with elevated temperatures and high temperature gradients during curing can be eliminated. The low pH of the LHHPC of the present invention should also make the composition more suitable than conventional concretes for application with new reinforcing and pre- and post stressing materials, such as those based on silica-glass fibre technology.

Because silica flour can be used in large quantities in the compositions of the present invention, and its cost is at present less than that of cement, the LHHPC of the present invention also presents commercial advantages over SHPC.

We claim:

1. A cementitious composition comprising:
   a. Portland cement;
   b. pozzolanic silica;
   c. inert mineral flour;
   d. aggregate;
   e. superplasticizer; and
   f. water;
wherein the amount of Portland cement in the composition is in the range of 3% to 10%, the ratio of Portland cement to pozzolanic silica is between 1:0.8 and 1:1.2, the ratio of Portland cement to inert mineral flour is between 1:1.6 and 1:2.4 and the water/cementitious materials ratio of the composition is in the range of 0.40–0.55.

2. The composition of claim 1 wherein the ratio of Portland cement to pozzolanic silica to inert mineral flour is about 1:1:2.

3. The composition of claim 1 wherein the water/cementitious materials ratio of the composition is in the range of 0.46–0.49.

4. The composition of claim 1 wherein the amount of Portland cement is in the range of 3.5 to 4.5%.

5. The composition of claim 1 wherein the pozzolanic silica is condensed silica fume.

6. The composition of claim 1 wherein the inert mineral flour is selected from the group consisting of silica flour, ilmenite and iron oxide having an equivalent spherical particle size of up to about 50 μm.

7. The composition of claim 1 wherein the inert mineral flour is silica flour.

8. The composition of claim 1 wherein the aggregate is a mixture of coarse aggregate largely in the range of about 4.5 to 12.5 mm size and a sand-sized fine aggregate.

9. A cementitious composition comprising:
   a. Portland cement;
   b. pozzolanic silica fume;
   c. non-pozzolanic silica flour;
   d. aggregate;
   e. superplasticizer; and
   f. water;
wherein the amount of Portland cement is in the range of 3.5 to 4.5% by weight of the composition, the ratio of Portland cement to silica fume is between 1:0.8 and 1:1.2 and the ratio of Portland cement to inert mineral flour is between 1:1.6 and 1:2.4 and the water/cementitious material ratio of the composition is in the range of 0.46 to 0.49.

10. The composition of claim 9 wherein the silica flour has a particle size less than about 50 microns.

11. A cementitious composition according to claim 1, wherein said composition consists essentially of in parts by weight:

| | |
|---|---|
| a. Portland cement | 97 |
| b. pozzolanic silica fume | 97 |
| c. non-pozzolanic silica flour | 194 |
| d. aggregate | 1934 |
| e. superplasticizer | 10 |
| f. water | 92. |

* * * * *